Sept. 25, 1956    H. H. PORTER    2,764,399
MOTION WEIGHING APPARATUS
Filed Sept. 7, 1954
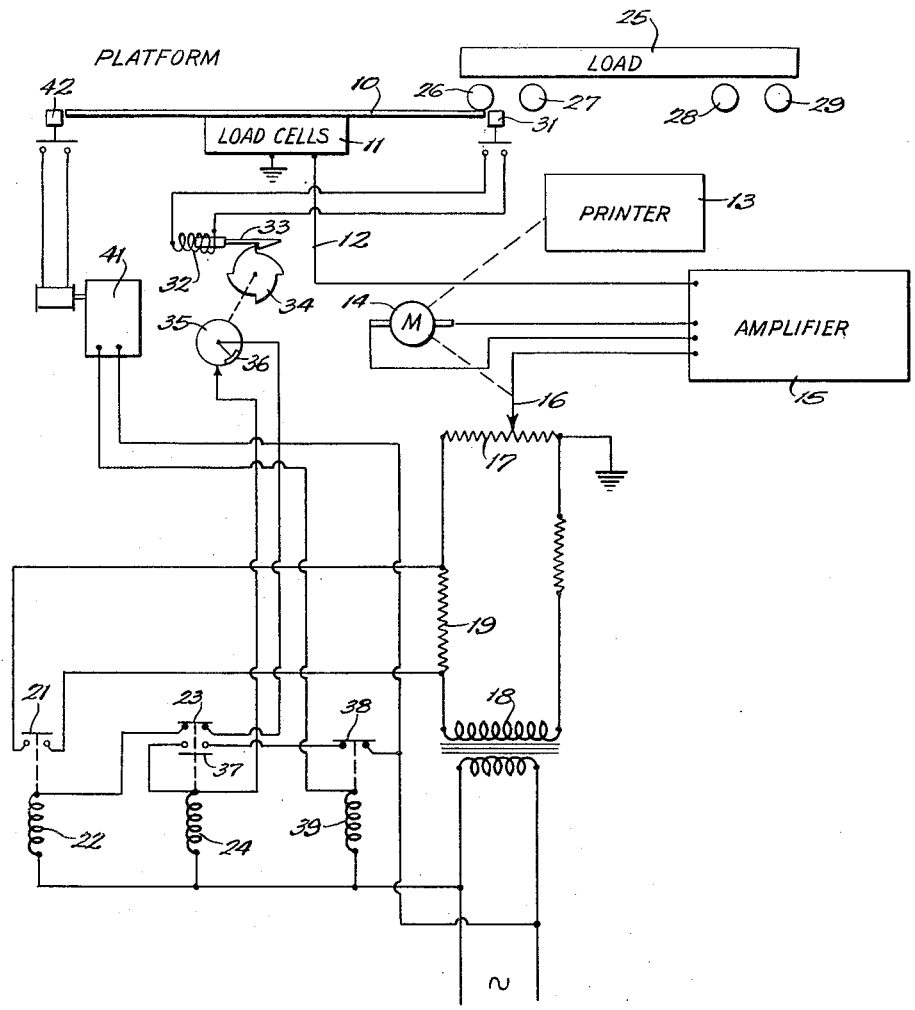
INVENTOR.
Henry H. Porter,
BY
Dair Freeman & Molinare
ATTORNEYS.

United States Patent Office 2,764,399
Patented Sept. 25, 1956

2,764,399

MOTION WEIGHING APPARATUS

Henry H. Porter, Washington, D. C., assignor to Streeter-Amet Company, Chicago, Ill., a corporation of Illinois Application September 7, 1954, Serial No. 454,505

7 Claims. (Cl. 265—5)

This invention relates to motion weighing apparatus and more particularly to apparatus for rapidly weighing multi-wheeled vehicles in motion.

In weighing moving vehicles, such as railway cars, trucks, and the like, the amount of time available for completion of a weighing operation depends on the length of the scale platform in excess of the vehicle length and on the speed of the vehicle. It is desirable to keep the platform as short as possible and at the same time to permit the vehicle to move at a relatively high rate of speed so that the time available to balance the scale and to operate the weight recording mechanism is extremely short. In recording mechanisms the interval is frequently too short to permit balancing of the scale and operation of the recording mechanism without either making the platform excessively long or reducing the vehicle speed to an undesirably slow rate.

There are also occasions, as in humping freight cars, when it is desirable to obtain very quickly the approximate weight of the car so that it can properly be retarded for a humping operation. With conventional types of scales now in use it is impossible to obtain even the approximate weight of the car with sufficient rapidity for this type of operation.

It is one of the objects of the present invention to provide a motion weighing apparatus in which the indicating or recording mechanism of the scale is adjusted to the approximate weight of the load before the load is fully supported on the scale. For example, with a conventional railway car having a plurality of sets of wheels, the scale mechanism will be adjusted to the approximate total weight of the car when only part of the car wheels are on the platform and will be accurately adjusted to the weight of the car when all of the wheels are on the platform.

Another object is to provide a motion weighing apparatus in which the response of the indicating or recording mechanism to a given load is changed by movement of the load onto and from the scale.

According to one feature, the response is changed by counting devices operated by the vehicle wheels so that the rate change will occur only when the vehicle is completely on the platform or has completely left the platform.

The above and other objects and features of the invention will be more readily apparent from the following description when read in connection with the accompanying drawing, in which:

The single figure is a diagrammatic view of a motion weighing apparatus embodying the invention.

The apparatus, as shown, comprises a scale platform 10 which is slightly longer than the length of the vehicles to be weighed and which is supported on an electrical load cell assembly 11. The load cell assembly may comprise a number of load cells whose electrical characteristics change in response to the weight supported thereby to produce a change in voltage. The output voltage from the load cell assembly may be transmitted through a lead 12 to control operation of an indicating or recording mechanism.

As shown, the weight on the scale is adapted to be recorded by a printer 13 which is adjusted by a reversible motor 14 supplied with controlling voltage through an amplifier 15. The amplifier is connected to the lead 12 and to a wiper 16 movable across a potentiometer resistance 17 to change both phase and amplitude of the output current as the voltages at lead 12 and wiper 16 change thereby to control the motor 14. The load cells and potentiometer form a balanced circuit which is rebalanced by operation of the motor 14 by connecting the wiper 16 to the motor 14 to be adjusted thereby. In this arrangement, the motor will move to a position determined by the load cell voltage so that the printer 13 will be accurately adjusted to a value proportional to the weight on the load cells.

According to the present invention, response of the indicating or recording mechanism to a given load on the scale is multiplied when the load is not completely on the platform so that the mechanism will be adjusted to a position representing approximately the total weight of the load when the load is only partly on the platform. For this purpose the resistor 17 is supplied with voltage at different values when the load is partially on the scale and when it is fully on the scale. While this may be done in many different ways, one very simple arrangement is shown wherein the resistor 17 is supplied from a transformer secondary 18 through a series resistor 19 which is adapted to be cut effectively into or out of the circuit. When the resistor 19 is in circuit, the wiper 16 will have to move through a greater distance to rebalance a given load cell voltage than when the resistor 19 is out of circuit and by proper selection of values, this movement can be made such as to effect an adjustment of the printing mechanism to the approximate total weight of the load when only a part of the load is on the scale platform. It will be understood that instead of effecting a single voltage change, as shown, a plurality of voltage changes could be affected successively as the load moves onto the platform to maintain an approximate indication of the load as more and more of the load is supported by the platform.

The resistor 19 may be cut out of the potentiometer circuit by a switch 21 which is normally closed and which is held open by a relay coil 22 when the coil is energized. The coil 22 is normally energized through a switch 23 controlled by a relay coil 24 so that the switch 21 will be held open and the resistor 19 will be effectively cut into the potentiometer circuit. When the switch 23 is opened, the coil 22 will be de-energized to allow the switch 21 to close by gravity or in response to a spring so that the resistor 19 will be short circuited and will be effectively cut out of the circuit.

The relay coil 24 is adapted to be energized in response to movement of a load to be weighed onto the scale platform 10. As shown, the platform is adapted to receive a standard railway car 25 having four sets of wheels 26 and 27 on its front truck and 28 and 29 on its rear truck. Movement of the car onto the scale platform is detected by a counting switch 31 positioned adjacent the platform entrance end to be operated by the wheels as they move onto the platform. The switch 31 controls the counting device, which is illustrated diagrammatically as including a solenoid 32, to move a ratchet pawl 33 each time the solenoid is energized. The pawl 33 moves a ratchet wheel 34 which is provided with a number of teeth equal to the number of sets of wheels on the vehicle. The ratchet 34 turns a rotary switch 35 having a single conducting segment 36 thereon which will temporarily complete a circuit through the relay coil 24 once during each revolution of the ratchet wheel. The ratchet mechanism is adjusted so that a circuit to the coil 24 wil be completed after the last set of wheels 29 of a car has passed over the switch 31 to enter the scale platform at a time when the car is entirely supported on the platform. When the coil 24 is energized it will open the switch 23 to de-energize the coil 22 and will close a switch 37 to complete a holding circuit through the coil 24.

The holding circuit also includes a normally closed switch 38 which is adapted to be opened by a relay coil 39 whenever the coil 39 is energized. The coil 39 is controlled by a counting switch mechanism 41 which may be similar to the mechanism 32—36 and which is controlled by a switch 42 at the exit end of the platform. The counting switch mechanism 41 is so adjusted that it will complete a circuit through the winding 39 when the last set of wheels 29 on the vehicle leaves the platform and passes over the switch 42.

In operation, the circuit elements are normally in the position shown with switches 21 and 37 open, switches 23 and 38 closed and the circuits through both of the counting mechanisms open. At this time, the resistance 19 is effectively in the potentiometer circuit and minimum voltage is supplied to the resistor 17. When the wheels on the first truck on the vehicle enter the scale platform, the weight exerted thereby will cause a multiplying movement of the motor 14 which in case of a standard railway car, as shown, may involve a multiplying factor of two. Thus, when the first two sets of wheels 26 and 27, comprising the front truck of the vehicle, are on the platform the printer will be moved to a position corresponding approximately to the total weight of the car even though the platform is supporting only approximately one-half of the weight of the car.

As the car moves further on to the platform, the switch 31 will be operated by the wheels on the trailing truck and when the last set of wheels 29 cross the switch 31, a circuit will be temporarily completed through the coil 24 to open switch 23 and de-energize relay 22. When wheels 28 are on the scale and wheels 29 are not the apparatus may tend to indicate an excess weight since the scale is supporting approximately three fourths of the weight of the car and is multiplying by two. However, the interval before wheels 29 enter the scale is so short that no appreciable unbalance will result. At this time, the entire weight of the car is on the platform and the switch 21 is opened so that the motor 14 will be adjusted at a normal rate proportional to the total weight of the car. Since this motor already occupied a position corresponding approximately to the total weight of the car before the car fully entered the scale platform, only a relatively small adjustment of the motor and printing mechanism will be required during the interval the car is fully on the platform. For this reason, the interval of time necessary to adjust the scale mechanism is reduced to a minimum and the necessity of effecting range changing operations in the mechanism are eliminated. The platform can therefore be made relatively short and the vehicle can travel at a relatively high speed while still providing sufficient time for completion of a recording operation.

As the vehicle leaves the platform the wheels will operate the switch 42 and when the last set of wheels leaves the platform the counting mechanism 41 will complete a circuit through the coil 39 to open the switch 38. Opening of the switch 38 interrupts the holding circuit through coil 24 to de-energize it so that switch 23 will again close and holding switch 37 will open. Closing of the switch 23 will energize the coil 22 to open switch 21 and cut the resistor 19 back into the potentiometer circuit so that the apparatus is in condition to weigh a second car.

In using the apparatus for operations, such as humping, where it is desired to obtain only the approximate weight of the car, the front truck will be on the scale a sufficient length of time even though the car is moving quite rapidly to enable adjustment of the printing mechanism or a visual indicating mechanism to the approximate car weight. If the apparatus is to be used only for this purpose the counting switches may be eliminated and the indication obtained during the relatively long interval the front trucks or the rear trucks only are on the scale may be relied on with the very short interval both trucks are on the scale being insufficient to disturb the operation. It will be seen, however, that the same apparatus can be used for quick approximations of weight or for accurate motion weighing without requiring any changes or adjustments.

It will be apparent that a plurality of voltage changes in excess of two could be made to maintain a closer approximation to the total load. For example, in weighing a standard railway car as shown, the resistor 19 might be made in three sections in series with all of them effective to produce minimum voltage and maximum multiplication when only one set of wheels is on the platform, two of them effective when two sets of wheels are on the platform, only one effective when three sets of wheels are on the platform and none of them effective when the car is fully on the platform.

While one embodiment of the invention has been shown and described, it will be understood that this is illustrative only and is not to be taken as a definition of the scope of the invention, reference being had for this purpose to the appended claims.

What is claimed is:

1. In a motion weighing apparatus for weighing loads having a plurality of spaced sets of supports, a scale onto which the sets of supports of the loads are adapted to pass successively and which is of a length to receive all of the sets of supports on a load simultaneously, sensing means responsive to the weight on the scale, indicating means connected to the sensing means and operated thereby, means in the sensing means to multiply the normal response thereof to a given weight on the scale whereby the sensing means will indicate substantially the full weight of the load when less than all of the supports are on the scale, means operated by movement of a predetermined number of supports onto the scale to make the multiplying means ineffective, and means operated by movement of a predetermined number of supports from the scale to make the multiplying means effective.

2. In a motion weighing apparatus for weighing loads having a plurality of spaced sets of supports, a scale onto which the sets of supports of the loads are adapted to pass successively and which is of a length to receive all of the sets of supports on a load simultaneously, sensing means responsive to the weight on the scale, indicating means connected to the sensing means and operated thereby, means in the sensing means to multiply the normal response thereof to a given weight on the scale whereby the sensing means will indicate substantially the full weight of the load when less than all of the supports are on the scale, a counting device operated by the supports of the load as they move successively onto the scale, means operated by the counting device after a number of operations thereof equal to the number of sets of supports on the load to make the multiplying means ineffective, and means operated by the supports of the load as it leaves the scale to make the multiplying means effective.

3. In a motion weighing apparatus for weighing loads having a plurality of spaced sets of supports, a scale onto which the sets of supports of the loads are adapted to pass successively and which is of a length to receive all of the sets of supports on a load simultaneously, electrical means responsive to the weight on the scale to produce a voltage proportional to the weight, electrically operated indicating means, a circuit including the electrical means connected to the indicating means to operate it in response to changes in the voltage produced by the electrical means, an element in the circuit to multiply the response of the indicating means to a given voltage in the circuit whereby the sensing means will indicate substantially the full weight of the load when less than all of the supports are on the scale, and means operated by movement of a predetermined number of supports onto the scale to make said element ineffective.

4. In a motion weighing apparatus for weighing loads having a plurality of spaced sets of supports, a scale onto which the sets of supports of the loads are adapted to pass successively and which is of a length to receive all of the sets of supports on a load simultaneously, electrical means responsive to the weight on the scale to produce a voltage proportional to the weight, electrically operated indicating means, a circuit including the electrical means connected to the indicating means to operate it in response to changes in the voltage produced by the electrical means, an element in the circuit to multiply the response of the indicating means to a given voltage in the circuit whereby the sensing means will indicate substantially the full weight of the load when less than all of the supports are on the scale, a counting device operated by the supports of a load as it moves onto the scale, means operated by the counting device after a predetermined number of operations thereof equal to the number of sets of supports on the load to make said element ineffective, and means operated by movement of the load off of the scale to make said element effective.

5. In a motion weighing apparatus for weighing loads having a plurality of spaced sets of supports, a scale onto which the sets of supports of the loads are adapted to pass successively and which is of a length to receive all of the sets of supports on a load simultaneously, electrical means responsive to the weight on the scale to produce a voltage proportional to the weight, electrically operated indicating means, a circuit including the electrical means connected to the indicating means to operate it in response to changes in the voltage produced by the electrical means, an element in the circuit to multiply the response of the indicating means to a given voltage in the circuit whereby the sensing means will indicate substantially the full weight of the load when less than all of the supports are on the scale, a counting device operated by the supports of a load as it moves onto the platform, means operated by the counting device after a predetermined number of operations thereof equal to the number of sets of supports on the load to make said element ineffective, a second counting device operated by the supports of the load as it leaves the scale, and means operated by the second counting device after a number of operations thereof equal to the number of sets of supports on the load to make said element effective.

6. In a motion weighing apparatus for weighing vehicles having a plurality of sets of wheels, a platform across which the sets of wheels of the vehicle are adapted to pass successively and which is of a length to receive all of the sets of supports on a load simultaneously, electrical means responsive to the load on the platform to produce a voltage proportional to the load, an adjustable potentiometer to produce a voltage, a motor to adjust the potentiometer, a balanced circuit connecting the electrical means and the potentiometer, means responsive to unbalance in the circuit to control the motor in a direction to rebalance the circuit, an impedance in circuit with the potentiometer to multiply the movement of the motor required to rebalance a given voltage at the electrical means whereby the motor must move to a position corresponding substantially to the full weight of the vehicle to rebalance the circuit when only a part of the vehicle wheels are on the platform, and means responsive to movement of a vehicle completely onto the platform to cut said impedance effectively out of the potentiometer circuit.

7. In a motion weighing apparatus for weighing vehicles having a plurality of sets of wheels, a platform across which the sets of wheels of the vehicle are adapted to pass successively and which is of a length to receive all of the wheels of a vehicle simultaneously, electrical means responsive to the load on the platform to produce a voltage proportional to the load, an adjustable potentiometer to produce a voltage, a motor to adjust the potentiometer, a balanced circuit connecting the electrical means and the potentiometer, means responsive to unbalance in the circuit to control the motor in a direction to rebalance the circuit, an impedance in circuit with the potentiometer to multiply the movement of the motor required to rebalance a given voltage at the electrical means whereby the motor must move to a position corresponding substantially to the full weight of the vehicle to rebalance the circuit when only a part of the vehicle wheels are on the platform, a counting device operated by the wheels of the vehicle as it moves onto the platform, means controlled by the counting device after a number of operations thereof equal to the number of sets of wheels on the vehicle to cut the impedance effectively out of circuit, a second counting device operated by the wheels of the vehicle as it moves off of the platform, and means controlled by the second counting device after a number of operations thereof equal to the number of sets of wheels on the vehicle to cut the impedance into the potentiometer circuit.

References Cited in the file of this patent

UNITED STATES PATENTS

| Number | Name | Date |
|---|---|---|
| 1,579,658 | Pugh | Apr. 6, 1926 |
| 2,103,618 | Haegele | Dec. 28, 1937 |
| 2,543,794 | Mayer | Mar. 6, 1951 |
| 2,598,812 | Marco | June 3, 1952 |
| 2,673,082 | Thurston | Mar. 23, 1954 |